United States Patent [19]

Winyall et al.

[11] 4,387,008
[45] Jun. 7, 1983

[54] ELECTRODIALYTIC METHOD FOR PRODUCTION OF SILICA GEL

[75] Inventors: Milton E. Winyall, Columbia, Md.; Charles Davidoff, Manhasset, N.Y.

[73] Assignee: W. R. Grace & Co., New York, N.Y.

[21] Appl. No.: 215,763

[22] Filed: Dec. 12, 1980

Related U.S. Application Data

[62] Division of Ser. No. 80,485, Oct. 1, 1979, Pat. No. 4,279,879.

[51] Int. Cl.³ .............................................. C25B 1/00
[52] U.S. Cl. ................................................... 204/101
[58] Field of Search .................. 204/180 P, 151, 101, 204/59 R, 103; 423/335, 338

[56] References Cited

U.S. PATENT DOCUMENTS

| | | | |
|---|---|---|---|
| 1,557,491 | 10/1925 | Codd | 204/101 X |
| 1,562,940 | 11/1925 | Collins | 204/101 X |
| 3,668,088 | 6/1972 | Iler | 204/101 |
| 3,794,712 | 2/1974 | Aboutboul et al. | 423/338 |
| 3,801,705 | 4/1974 | Krekeler et al. | 423/338 |
| 3,819,811 | 6/1974 | Aboutboul et al. | 423/338 |
| 3,888,972 | 6/1975 | Kiselev et al. | 423/338 |
| 3,975,293 | 8/1976 | LePage | 252/317 |
| 3,996,338 | 12/1976 | Frampton | 423/335 |
| 4,053,565 | 10/1977 | Krekeler et al. | 423/338 |
| 4,061,724 | 12/1977 | Grose et al. | 423/335 |
| 4,124,471 | 11/1978 | Lieb et al. | 204/180 P |
| 4,147,605 | 4/1979 | Schenker et al. | 204/180 P |
| 4,148,864 | 4/1979 | Groth et al. | 423/335 |
| 4,190,457 | 2/1980 | McDaniel | 106/122 |
| 4,193,851 | 3/1980 | Crawford et al. | 204/101 |

FOREIGN PATENT DOCUMENTS 816581 7/1959 United Kingdom .
1545702 5/1979 United Kingdom .

OTHER PUBLICATIONS

Policard and Collet, "Étude Expérimentale des Lésions Rénales Provoquées par Élimination de la Silice", 60, *J. Urol.* 164–171, (Paris, France, 1954).

*Primary Examiner*—Howard S. Williams
*Attorney, Agent, or Firm*—Mark T. Collins; Arthur P. Savage

[57] ABSTRACT

Silica hydrogel is prepared by electrolysis of an aqueous anolyte solution containing an alkali metal silicate and a salt of a non-siliceous anion, such as sodium nitrate or sodium sulfate, in a cell with a cation permselective membrane separating the anolyte and an aqueous catholyte. The electrolysis is effected in the presence of the salt to deposit silica hydrogel on the anode. The hydrogel can be easily recovered from the anode and dried to produce regular and intermediate density silica xerogels having narrow pore size distributions.

38 Claims, 1 Drawing Figure

ELECTRODIALYTIC METHOD FOR PRODUCTION OF SILICA GEL

This is a division of application Ser. No. 80,485, filed Oct. 1, 1979, now U.S. Pat. No. 4,279,879.

This invention relates to silica gel and its preparation by electrodialysis of a silicate.

Electrolysis and electrodialysis of an alkali metal silicate solution have been used to remove alkali metal ions with water of hydration from the solution and produce solutions with higher silica concentrations and silica sols. U.S. Pat. No. 1,557,491 of Codd discloses a process of preparing an alkali silicate solution having a high ratio of silica to soda by electrolyzing a lower ratio solution in a two compartment cell between a rotating platinum anode and mercury cathode. In the process, low initial silica concentration, rapid rotation of the anode or anolyte, and controlled current density avoid substantial deposition of silica on the anode and the electrolysis is limited so that a sol or gel is not formed. The patent notes that separation of silica at the anode makes the process much less efficient and that, as the soda is removed, the conductivity of the solution falls and total removal of soda involves considerable electrical inefficiency.

In U.S. Pat. No. 1,562,940, Collins discloses a process for producing pure silicic acid hydrosol by electrolyzing an aqueous solution of water glass between a rapidly rotating anode and a mercury cathode. The process permits practically complete removal of sodium so that the sol sets to a gel a few hours after the last traces of sodium have been removed. Rotation of the anode prevents deposition of silica, particularly when the silicate is diluted. Collins teaches that, if the deposition of silica is not prevented, the silicate solution would become useless due to dilution and the silica would in time serve as an insulator for the anode and prevent the passage of current.

U.S. Pat. No. 3,668,088 of Iler describes an electrodialysis process for making concentrated silica sols that may be used to make pure silica gel. Iler discloses that the sols produced in prior methods of electrolysis or electrodialysis either gel or precipitate silica within the electrolysis equipment. Iler solved this problem by interposing an anion-impermeable, cation-permeable membrane between the anode and the silica sol to prevent silicate ions from migrating to the anode. In the process of the patent, a sol-electrolyte containing an aqueous silica sol, an aqueous sodium or potassium silicate solution, and a sodium or potassium salt of a non-siliceous anion is electrolyzed while separated from an acid anolyte by the cation-permeable, anion-impermeable membrane. Hydrogen ions from the anolyte are drawn through the membrane into the sol-electrolyte and alkali metal ions are removed from the sol-electrolyte to the cathode. The temperature of the sol-electrolyte is maintained between 50° and 100° C. and aqueous alkali metal silicate solution is added to the sol-electrolyte as needed to maintain the pH of the sol-electrolyte between 8.0 and 9.5 so that little migration of silicate ion toward the anode occurs. The salt of the non-siliceous anion employed in the Iler process lowers the electrical resistance of the sol-electrolyte by providing anions other than silicate and hydroxyl ions to carry the current toward the anode. Iler discloses that, when the current is carried by silicate ions, the silicate ions migrate toward the anode and deposit silica upon the membrane, thus further increasing the resistance and eventually terminating the process. The sol-electrolyte must be agitated strongly near the surfaces of the membrane in order to prevent deposition of silica.

In U.S. Pat. No. 4,124,471, Lieb et al. disclose a method of preparing a silica sol by effecting electrodialysis of an alkali metal silicate anolyte in a cell with a cation permselective membrane separating the anolyte and an alkali metal hydroxide catholyte while adding an alkali metal silicate solution to the anolyte to maintain the pH in the range of from about 7.5 to about 8.5. When the silica sol has reached the desired particle size, the silicate feed is replaced with an alkali metal hydroxide solution to control the pH and terminate silica particle growth. Continued electrodialysis with addition of an alkali metal hydroxide solution increases the concentration of the sol due to continued removal of alkali metal ions with water of hydration. Silica deposition on the anode and consequent loss of electrical efficiency by the anode are essentially prevented by the control of the pH of the anolyte.

Silica gels include silica hydrogels and silica xerogels. Silica hydrogels are conventionally prepared by reacting an alkali metal silicate and an acid in an aqueous medium to form a silica hydrosol, allowing the hydrosol to set to a hydrogel, and washing the hydrogel. Xerogels are prepared by drying the hydrogel. In U.S. Pat. Nos. 3,794,712 and 3,819,811, Aboutboul et al. disclose silica xerogels having a narrow pore diameter distribution primarily in the range of from 300 to 600 angstroms, a surface area of from 200–500 square meters per gram, and a pore volume of from about 2.0 to about 3.5 cubic centimeters per gram. U.S. Pat. No. 4,148,864 of Groth et al. discloses a silica gel of increased adsorption power which may have a pore diameter of 20–25 angstroms.

The present invention provides a method of preparing silica gel which comprises electrolyzing an aqueous anolyte solution of an alkali metal silicate and a salt of a non-siliceous anion. The concentration of the salt is at least about 0.01 normal and the solution is electrolyzed in a cell having a cation permselective membrane separating the anolyte and an aqueous catholyte solution. Silica hydrogel is deposited on an anode of the cell, recovered from the anode, and may be dried to produce silica xerogel.

Applicants have suprisingly found that the method produces silica hydrogel on the anode of unexpectedly high purity with low current requirements. The hydrogel is formed by the reaction of silicate ions and associated hydroxyl ions with hydrogen ions produced by the electrolysis of water at the anode. The salt concentration provides sufficient non-siliceous anions to maintain the electrical conductivity of the anolyte and silica hydrogel deposit during electrolysis and promote gelation.

The silica hydrogel prepared by the method of this invention has lower alkali metal and anion contents than that produced by conventional acid treatments of silicate without extensive washing. Because of the elimination of the need for washing the hydrogel and the production of concentrated alkali metal hydroxide solution in a preferred method, the direct manufacturing costs are lower than conventional acidification procedures. Further, xerogels prepared in accordance with the method of this invention have narrower pore size distributions than the products of conventional methods due to more uniform gelation conditions.

Figure 1:
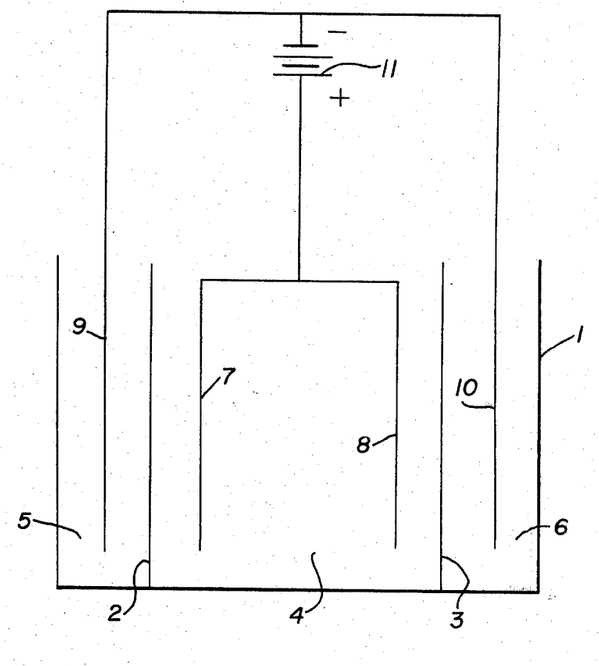
The drawing is a diagrammatic representation of a typical electrodialysis cell suitable for practicing the method of this invention.

Specifically, an electrodialysis cell is shown having a housing 1. Cation permselective membranes 2 and 3 and the housing define a central anode compartment 4 and terminal cathode compartments 5 and 6. Anodes 7 and 8 are positioned in the anode compartment and cathodes 9 and 10 in the respective cathode compartments. The electrodes are connected to a source of direct electrical current 11. Cells having single or additional anode and cathode compartments may be used if desired.

In the operation of the cell, initial charges of anolyte and catholyte are fed into the respective compartments and a direct electric current is applied to the electrodes. During electrodialysis, alkali metal ions with water of hydration migrate from the alkali metal silicate and salt solution in the anode compartment through the cation permselective membrane to the cathode compartment. Water is electrolyzed at the cathode and accepts electrons from the cathode in the reaction $2H_2O + 2e^- \rightarrow H_{2(g)} + 2OH^-$. Silicate ions, hydroxyl ions, and the non-siliceous anions in the anolyte solution migrate to the anode in the anode compartment. Water is electrolyzed at the anode and gives up electrons to the anode in the reaction $2H_2O \rightarrow O_{2(g)} + 4H^+ + 4e^-$. The hydrogen ions produce an acidic pH region in the vicinity of the anode in the substantial absence of agitation. The silicate ions and associated hydroxyl ions react with the hydrogen ions and condense to form a deposit of silica hydrogel on the anode. Alkali metal ions may be occluded in this deposit. However, the occluded positive ions are repelled by the anode and migrate to the outer surface of the deposit as it builds in depth and electrodialysis continues.

Electrodialysis is generally continued until the depth of the silica hydrogel deposit is from about 0.5 to about 4 centimeters and the silica hydrogel is recovered from the anode. A solution of silicate and salt may be added to the anode compartment as necessary to compensate for the silicate ions and salt anions removed by recovery of silica hydrogel and catholyte solution may be removed from the cathode compartment as necessary to accomodate increases in its volume. The oxygen gas generated at the anode and hydrogen gas generated at the cathode may be collected or simply vented out of the system.

The silica concentration, anolyte temperature, current density, and treatment after electrodialysis are the primary variables that determine whether the dried product is a regular density (RD) silica gel or an intermediate density (ID) silica gel. RD gels have extremely fine pores and large surface areas. ID gels have lower surface areas and much larger average pore diameters and pore volumes than RD gels. Generally, lower initial silica concentrations, lower current densities, and lower anolyte temperatures in electrodialysis and high pH treatments after electrodialysis produce intermediate density gels.

The anolyte is an aqueous solution of at least one water soluble alkali metal silicate and at least one water soluble salt of a non-siliceous anion. Preferably, the silicate is an aqueous solution of sodium silicate or potassium silicate. The silica concentration of the anolyte solution generally may range from about 5 weight percent to about 30 weight percent calculated as $SiO_2$. The pH of the silicate solution may generally be at least about 10 and preferably is at least about 12. During electrodialysis, the silica concentration and pH of the anolyte solution decrease depending upon the amount of anolyte solution added to the anode compartment. When the anolyte solution has a silica concentration of about 5 weight percent, the anolyte is generally heated to a temperature of from about 50° to about 100° C. to produce small but acceptable quantities of hydrogel on the anode. At silica concentrations of about 29 weight percent, the alkali metal levels in the hydrogel are relatively high, for example, on the order of about 1.0 weight percent calculated as the alkali metal oxide. Preferably, the anolyte solution contains from about 8 to about 28 weight percent $SiO_2$. At these concentrations and pH's greater than about 12, substantial current is carried by the non-siliceous, silicate, and hydroxyl ions and thus substantial quantities of silica hydrogel are formed in the vicinity of the anode with lower current requirements.

The anolyte silica concentration is inversely related to the water content of the hydrogel recovered from the anode and thus the pore volume of the dried gel. Generally, a silica concentration of from about 8 to about 15 percent is used for production of ID gels and about 15 to about 28 percent is used for production of RD gels. The particular silica concentration within the preferred range has little effect on the average pore diameter of RD gels but the average pore diameter of ID gels decreases with increased silica concentrations within the preferred range.

The anolyte solution may have a silica to alkali metal oxide ($SiO_2$ to $M_2O$) weight ratio of from about 1:1 to about 4:1. Typically, the silica to alkali metal oxide weight ratio in the anolyte solution is about 3.25:1. Silica to alkali metal oxide ratios of 3.7:1 or higher reduce the electric current requirements of the method because there are fewer alkali metal ions to be removed from the anolyte by electrodialysis. However, high ratio solutions are more expensive and their use reduces the yield of alkali metal hydroxide solution in the cathode compartment.

In addition to the alkali metal silicate, the anolyte solution also contains a salt of a non-siliceous anion (other than chloride) to maintain the electrical conductivity of the cell during electrodialysis and promote gelation. The salt maintains conductivity by providing anions in addition to silicate and hydroxyl ions to carry the current through the anolyte and the hydrogel deposit to the anode. The anions permit continued operation with economically practical electrical requirements despite the increased resistance caused by the silica hydrogel deposit. The presence of the anions also avoids deposition of a thin non-conductive plate of finely divided silica on the anode and consequent excessive resistance and cell shutdown.

The salt may be a neutral salt of a strong acid (e.g., sodium sulfate or sodium nitrate), a basic salt of a weak acid (e.g., sodium borate or sodium carbonate), or an acidic salt of a weak base (e.g. ammonium sulfate). Suitable anions that provide the necessary increased conductivity include nitrate, nitrite, carbonate, bicarbonate, sulfate, sulfamate, borate, acetate, citrate, oxalate, silicofluoride, sulfosalicylate, fluoride, phosphate, or mixtures thereof. Sulfate, nitrate, and carbonate salts are generally used because of their relatively low cost and ease of handling. Nitrate and carbonate salts are preferred when these anions are objectionable in the product since they are removed on drying. A nitrate salt increases conductivity more than a carbonate salt of the same cation at the same concentration and its use thus reduces electrical costs. In the production of RD gel by the method of this invention, an anion of a strong acid, such as sulfate or nitrate, is used.

The anion is generally added to the silicate solution in the form of an alkali metal salt, such as a sodium or potassium salt, or of an ammonium salt. Preferably, a salt of the same alkali metal as is present in the alkali metal silicate is employed. The salt may also be incorporated into the anolyte by adding a source of non-siliceous anion which will form the salt in situ. For example, sodium carbonate and/or bicarbonate may be provided in the anolyte solution by adding carbon dioxide.

The salt concentration employed will vary in accordance with the desired degree of conductivity and hydrogel porosity. Increased salt concentrations provide increased conductivity but more current is necessary to produce the same weight of silica hydrogel product as the amount of alkali metal in the solution is increased. The increased current demands are balanced economically by the increased recovery of alkali metal hydroxide. The relative tendencies of the ions in the anolyte to carry the current depend upon their relative concentrations and the concentrations of silicate and hydroxyl ions depend upon anolyte pH. The salt concentration is thus selected to provide a balance of salt anions, silicate ions, and hydroxyl ions to carry the current. It has been found that a salt concentration of at least about 0.01 normal is generally necessary to provide sufficient conductivity and deposit silica hydrogel on the anode in the method of this invention. Normalities of from about 0.01 to about 0.25 are preferred to balance current demand and conductivity.

The aqueous catholyte may be any aqueous electrolyte that is compatible with alkali metal ions and the membrane and that has sufficient conductivity for cell operation. The catholyte is generally a solution of at least one alkali metal hydroxide. Preferably, the alkali metal hydroxide used is sodium hydroxide. The alkali metal hydroxide generally is present in the solution in an amount from about 1 to about 30 weight percent, preferably about 5 weight percent, at the start of the operation of the cell. The concentration of the hydroxide solution will increase during operation to from about 25 to about 35 weight percent. The catholyte is ordinarily a solution of the hydroxide of the same alkali metal as is present in the anolyte to provide a concentrated solution of the hydroxide as a byproduct of the method.

The electrodes utilized in the electrodialysis cell can be fabricated from any suitable materials that are chemically resistant to the anolyte solution, oxygen liberated at the anode, catholyte solution, and hydrogen liberated at the cathode. The anode preferably comprises a platinum group metal, metal oxide, or mixture thereof and more preferably comprises a conductive coating of these materials on a metal substrate of titanium, tantalum, zirconium, niobium, hafnium, or mixtures thereof. As especially suitable anode comprises a platinum group metal oxide coating on a titanium substrate. The preferred types of anodes are described, for example, in U.S. Pat. Nos. 3,778,307 and 3,711,385. The cathode can comprise ferrous materials, such as iron, steel, or stainless steel; nickel; or a nickel alloy. The electrodes are usually used in the form of a sheet or cylindrical rod.

The cation permselective membranes used in this invention allow cations to pass through them from the anode compartment to the cathode compartment while preventing passage of anions from one compartment to the other. The membrane may comprise any of the commercially available cation exchange resins which are chemically resistant to the electrolytes used in the cell and have a low resistance value to provide a high current efficiency and a sufficient lifetime for commercial cell operation. Suitable membranes generally comprise a film of a sulfonated vinyl polymer or copolymer. Typically, the film is impregnated on an electrically non-conductive, inert, reinforcing member, such as woven or non-woven fabric made of fibers of asbestos, glass, TEFLON, or the like.

On type of membrane which may be used in the present invention is a thin film of a cation exchange resin comprising a fluorinated copolymer having pendant sulfonic acid groups with the repeating structural units In formula (1), R represents the group in which R' is fluorine or perfluoroalkyl of 1–10 carbon atoms, Y is fluorine of trifluoromethyl, and m is 1, 2, or 3; and n is 0 or 1. In formula (2), X is fluorine, chlorine, trifluoromethyl, or hydrogen; and X' is X or $CF_3$−$(CF_2)_aO$−, wherein a is 0 or an integer from 1 to 5. The mole percent of the recurring structural unit of formula (1) ranges between 3 and 20 percent. Ion exchange resins of this type are described in British Pat. No. 1,184,321. Similar ion exchange resins which are copolymers of trifluorovinyl sulfonic fluoride and fluoroethylenes, fluorocarbon vinyl ethers containing sulfonic acid groups or derivatives thereof and fluoroethylenes, and trifluorovinyl sulfonic acids and fluoroethylenes, are described in U.S. Pat. Nos. 3,041,317; 3,282,875; and 3,624,053 respectively. Ion exchange resins of this type are available from E. I. duPont deNemours and Co. under the trademark NAFION.

A second type of membrane comprises a polymeric film having pendant sulfonic acid groups. The film is prepared by the polymerization of a polyvinyl aromatic compound and a monovinyl aromatic compound in an inert organic solvent under conditions which prevent solvent evaporation and the sulfonation of the product. Suitable polyvinyl aromatic compounds include divinyl benzenes, divinyl toluenes, and similar polymerizable aromatic compounds which are polyfunctional with respect to vinyl groups. The monovinyl aromatic compound which will generally be the impurities present in commercial grades of polyvinyl aromatic compounds may be styrene, isomeric vinyl toluenes, vinyl napthalenes, vinyl ethyl benzenes, vinyl chlorobenzenes, vinyl xylenes, and alpha substituted alkyl derivatives thereof, such as alpha methyl vinyl benzene. These polymers are sulfonated to such an extent that there are not more than four equivalents of sulfonic acid groups formed for each mole of polyvinyl aromatic compound in the polymer and not less than one equivalent of sulfonic acid group formed for each ten moles of poly-and monovinyl aromatic compound in the polymer. These ion exchange resins are further described in U.S. Pat. No. 2,731,411. Ion exchange resins of these polymers containing functional groups of both the sulfonic acid and carboxylic acid radicals are described in U.S. Pat. No. 3,887,499. Membranes of this type are available from Ionics, Inc., under the trademark IONICS CR6.

Electrodialysis in the method of this invention may be conducted using a constant current density or a constant voltage. In operations of less than about eight hours in duration, a constant anode current density of from about 0.1 to about 2 amperes per square inch of anode area is generally employed by increasing the voltage applied to the cell as electrodialysis proceeds and the resistance of the cell increases. The term anode area as used herein is defined as the area of the anode immersed in the anolyte solution. In operations of longer duration, a constant voltage of from about 5 to about 30 volts is applied to the cell to provide an initial maximum current density of from about 0.1 to about 2 amperes per square inch of anode area and the anode current density decreases as electrodialysis proceeds. Decreases in the anode current density are limited by the addition of the silicate and salt solution and removal of the hydrogel deposit from the anode. Generally, lower constant or initial maximum anode current densities of about 0.1 to about 0.4 amperes per square inch of anode area are employed to produce intermediate density silica gel.

The length of time that the current is passed through the electrodes is variable and depends upon the desired amount, purity, and density of the hydrogel deposit. For example, the method may be conducted for periods ranging from about 3 to about 75 hours or more.

The anolyte solution may be introduced into the cell at ambient temperatures or may be heated prior to introduction. Cooling means may be provided to maintain the anolyte at the desired temperature or the anolyte temperature may be allowed to increase during the run. Higher anolyte temperatures provide considerably higher hydrogen production rates with decreased cell resistance. Also, the hydrogel product will have a considerably lower pore volume. Generally, the temperature of the anolyte may vary from about 10° to about 100° C. The temperature range for RD gel production is generally from about 10° to about 80° C. The temperature of the anolyte solution is generally from about 10° to about 50° C. for ID gel production. Preferably, the temperature of the anolyte solution is from about 25° to about 45° C. When the initial silica concentration in the anolyte is about 5 weight percent, the anolyte is generally heated to about 50° to about 100° C. to produce small but acceptable quantities of hydrogel.

The electrolysis of the anolyte solution is conducted to deposit silica hydrogel on the anode. Substantial agitation of the anolyte solution is avoided since, in electrolysis with such agitation, only a tight, thin film of silica is deposited on the anode before the electrical resistance becomes too high for cell operation. For example, such a tight, thin film is deposited on the anode when the anolyte solution is circulated between the anode compartment and a storage container at a flow rate such that the entire anolyte solution is replaced every two minutes. Substantial agitation prevents the formation of a region of lower pH and high salt anion concentration in the vicinity of the anode by distributing the hydrogen ions, resulting from the anodic reaction of the decomposition of water to form oxygen, and the salt anions throughout the anolyte solution. Generally, the anolyte solution may be electrolyzed to deposit silica hydrogel on the anode under agitation of a Reynolds number of less than about 10 or lower, such as less than about 5 or less than about 1. Preferably, the anolyte solution is electrolyzed in the substantial absence of agitation. Generally, the only agitation in the method of this invention is that caused by the generation of oxygen gas at the anode and by the introduction of small quantities of additional anolyte solution into the anode compartment to maintain anolyte volume during electrolysis. For example, 30 milliliters of anolyte solution may be introduced into 2½ liters of anolyte solution in an anode compartment which is 5.5 inches deep, 6.5 inches high, and 4.25 inches wide.

When the initial silica concentration in the anolyte solution is from about 15 to about 28 weight percent, the hydrogel recovered from the anode will contain from about 35 to about 55 weight percent water. Throughout this specification, the water content of the hydrogels and xerogels was determined as total volatiles content by weight (TV%) by measuring the loss in weight after heating for one hour at 1750° F. (955° C.). From about 55 to about 60 weight percent water is present when the initial silica concentration is from about 8 to about 15 weight percent. These lower silica concentrations when combined with low anode current densities produce hydrogels containing from about 60 to about 65 weight percent water.

The hydrogel recovered from the anode contains lower alkali metal and anion levels than the gels produced by conventional silicate neutralization procedures so that washing is unnecessary for many applications. If higher purity levels are desired, the hydrogel may be washed with water, an acidic aqueous medium, or an alkaline aqueous medium. Intermediate density gels are produced by washing the hydrogel with an alkaline medium, such as an aqueous ammonium hydroxide solution, having a pH of from about 7 to 10. Regular density gels are prepared by washing the hydrogel with water or acidified water having a pH of from about 1 to about 4. In order to induce further silica polymerization and reduce shrinkage on drying, the hydrogel recovered from the anode may be aged at a temperature of from about 90° to about 180° F. (32°-82° C.) for a period of from about 5 to about 48 hours.

If especially pure hydrogels and xerogels are desired, the anolyte solution is removed from the cell and replaced with an aqueous acid anolyte solution. The acid anolyte is electrolyzed to purify the hydrogel. An aqueous solution of a strong acid, or of a weak acid, of the same non-siliceous anion as that of the salt in the anolyte solution is preferably used as the acid anolyte. Aqueous solutions of nitric acid or carbonic acid are especially preferred since they are removed on drying. Electrolysis is effected to provide the desired degree of removal of alkali metal ions and is generally effected for at least about one hour and preferably from about one to about three hours at a constant or initial maximum current density of from about 0.01 to about 0.4 amperes per square inch of anode area.

The hydrogel may be dried by any conventional means such as oven drying, tray drying, flash drying, or spray drying and ground in a fluid energy mill, hammer mill, or other known mill to the desired particle size.

Generally, the ground gels have a weight median particle diameter of from about 1 to about 40 microns.

The silica gels of this invention are described in terms of their pore size distributions, adsorptive capacities, surface areas, pore volumes, average pore diameters, and bulk densities. The surface areas and pore volumes were determined by the nitrogen adsorption method described in Brunauer, Emmett, and Teller, 60 *J. Am. Chem. Soc.* 309 (1938). The method is run to a P/Po of 0.967 so that pore diameters of from 14 to 600 angstroms are measured. The average pore diameter was calculated from the pore volume and surface area in accordance with the following equation $$\text{average pore diameter} = \frac{4 \times \text{pore volume} \times 10^4}{\text{surface area}}$$

The selective determination of the nitrogen pore volume within a given pore size range was made using the method described in Barrett, Joyner, and Halenda, 73 *J. Am. Chem. Soc.* 373 (1951). The adsorptive capacities of the xerogels of this invention were measured at a temperature of 75°–77° F. (24°–25° C.) and atmospheric pressure by the following procedure. The hydrogel was dried at 200° C. for 16 hours in a forced draft oven to a total volatiles content of about 5 to about 8 weight percent and ground with a mortar and pestle. 5 grams of the xerogel were placed in a container connected to a source of air at variable relative humidities of 10, 20, 40, 60, and 80 percent and ambient temperatures of 75°–77° F. (24°–24° C.). The air was passed upwardly through glass wool at the bottom of the container and through the xerogel and then to the atmosphere. The xerogel was allowed to remain in the container for 6 hours and weighed. The xerogel was then reinserted in the container for 1 hour intervals until a constant weight was achieved. The adsorptive capacity was calculated from the sample weight before and after the test in milliliters of water per 100 grams of sample or percent adsorption capacity.

Silica gels produced in accordance with this invention have narrower pore size distributions than those of conventionally prepared gels because of the more uniform gelation conditions. The intermediate density silica xerogels of this invention have at least about 90 percent of the pore volume of the gel provided by pores having pore diameters of from about 70 to about 180 angstroms. Preferably, at least about 95 percent of the pore volume is provided by pores having pore diameters of from about 70 to about 180 angstroms. The intermediate density xerogels also have a surface area of from about 250 to about 400 square meters per gram, a pore volume of at least about 1.0 milliliters per gram, preferably of from about 1.0 to about 1.2 milliliters per gram, an average pore diameter of from about 120 to about 160 angstroms, and an apparent bulk density of from about 0.35 to about 0.40 grams per milliliter. Because of their narrow pore size distribution, the intermediate density silica gels of this invention are particularly useful as catalyst supports and in chromatography. These gels are also useful, for example, as flatting agents, anti-blocking agents, thickening agents and anti-caking agents.

The regular density silica xerogels of this invention have at least about 85 percent, preferably at least about 90 percent, of the pore volume provided by pores having a pore diameter of less than about 30 angstroms. Preferably, at least about 60 percent of the pore volume is provided by pores having a pore diameter of less than about 20 angstroms. Due to the narrow pore size distribution, preferred regular density silica xerogels of this invention have an adsorption capacity of at least about 12 weight percent at 10 percent relative humidity. Preferably, these gels also have an adsorption capacity of at least about 35 percent at 80 percent relative humidity. These gels also have a surface area of from about 500 to about 1000 square meters per gram ($m^2/g$), a pore volume of from about 0.35 to about 0.50 milliliters per gram (ml/g), an average pore diameter of from about 18 to about 25 angstroms, and an apparent bulk density of from about 0.67 to about 0.75 grams per milliliter (g/ml). Regular density xerogels that are especially preferred for use as adsorbents have an average pore diameter of less than about 20 angstroms, such as an average pore diameter of from about 17 to about 19 angstroms. The regular density gels of this invention are excellent adsorbents and are also useful as polishing abrasives and catalyst supports.

The following examples describe several embodiments that illustrate the invention. All parts and percentages in the examples are by weight unless otherwise indicated.

EXAMPLE 1

This example illustrates the preparation of a silica hydrogel using a cell of the type shown in the drawing and of a regular density silica xerogel and an intermediate density silica xerogel from the hydrogel. The cell had a central anode compartment which was 5.5 inches deep, 6.5 inches high, and 4.25 inches wide, and two terminal cathode compartment each of which was 5.5 inches deep, 6.5 inches high, and 2.12 inches wide. The anode and cathode compartments were separated by Nafion membranes which were 4 inches in diameter. Two 2 by 4 inch platinum anodes were placed in the central anode compartment and one 2 by 4 inch stainless steel cathode was placed in each cathode compartment. Two and one-half liters of a solution containing 10 percent $SiO_2$, 3.25 parts of $SiO_2$ per part of $Na_2O$, and 2 grams per liter of sodium nitrate were placed in the anode compartment and one liter of a 4 percent sodium hydroxide solution was placed in the cathode compartments. The anolyte solution had a pH of approximately 13 and a sodium nitrate concentration of 0.024 normal. The platinum anodes and the stainless steel cathodes were connected to an adjustable source of direct current and power was applied at a constant DC voltage of 8 volts. The initial current through the cell was 5 amperes and the initial current density was 0.156 amperes per square inch of anode area. Electrolysis was continued for 47.5 hours and the anolyte temperature during the run was 25° to 35° C.

During the run, a sodium silicate solution containing 10 percent $SiO_2$ and 3.25 parts of $SiO_2$ per part of $Na_2O$ was added to the anode compartment as necessary to maintain volume and sodium hydroxide solution was removed as necessary from the cathode compartments. At the conclusion of the run, the current had dropped to 1.3 amperes and the concentration of the sodium hydroxide solution had increased to 12.4 percent NaOH.

522 grams of silica hydrogel were recovered from the anodes. The hydrogel had a total volatiles content of 61.90 percent, a $Na_2O$ content (dry basis) of 0.024 percent, and a $SO_4^=$ content (dry basis) of 0.017 percent. A portion of the hydrogel was washed by soaking it in a 10.8 pH aqueous ammonium hydroxide solution for twelve hours at 77° C. The ammonium hydroxide solution was changed twice during the first three hours. The hydrogel and soaked hydrogel were dried in a forced draft oven at 200° C. for 16 hours to produce, respectively, the regular density silica xerogel and intermediate density silica xerogel having the properties shown in Table I.

TABLE I

| | Regular Density (Dried) | Intermediate Density (Washed and Dried) |
|---|---|---|
| TV % | 4.93 | 2.26 |
| $Na_2O$ % (dry basis) | 0.049 | 0.006 |
| $SO_4^=$ % (dry basis) | 0.067 | 0.012 |
| Total nitrogen % (dry basis) | 0.007 | 0.020 |
| pH | 4.57 | 6.00 |
| Surface area ($m^2/g$) | 743.0 | 275.0 |
| Pore volume (ml/g) | 0.47 | 1.10 |
| Average pore diameter (Å) | 25.0 | 159.0 |

When referred to throughout this specification, the pH of a hydrogel or xerogel was determined as a 5 percent aqueous slurry of the hydrogel or xerogel. The pore distribution of the intermediate density xerogel is shown in Table II.

TABLE II

| Pore diameter (Å) | Cumulative Pore Volume (cc/g) | Cumulative Percent of Pore Volume |
|---|---|---|
| 600 | | |
| 580 | .0002 | .02 |
| 560 | .0005 | .04 |
| 540 | .0008 | .07 |
| 520 | .0012 | .10 |
| 500 | .0039 | .35 |
| 480 | .0042 | .38 |
| 460 | .0047 | .42 |
| 440 | .0052 | .46 |
| 420 | .0055 | .49 |
| 400 | .0064 | .57 |
| 380 | .0066 | .59 |
| 360 | .0075 | .67 |
| 340 | .0075 | .67 |
| 320 | .0075 | .67 |
| 300 | .0075 | .67 |
| 280 | .0075 | .67 |
| 260 | .0081 | .72 |
| 240 | .0102 | .90 |
| 220 | .0130 | 1.16 |
| 200 | .0163 | 1.45 |
| 180 | .0338 | 3.01 |
| 160 | .1211 | 10.79 |
| 150 | .2320 | 20.67 |
| 140 | .4038 | 35.98 |
| 130 | .5560 | 49.53 |
| 120 | .7191 | 64.07 |
| 110 | .8585 | 88.46 |
| 90 | 1.0756 | 95.82 |
| 80 | 1.1225 | 100.00 |

This xerogel had 97.09 percent of its pore volume provided by pores having pore diameters of from 80 to 180 angstroms.

EXAMPLE 2

This example again illustrates the preparation of regular density and intermediate density silica xerogels from the same hydrogel recovered from the anodes by varying the treatments after removal from the cell. The procedure of Example 1 was followed except that the D.C. voltage was applied to the cell for 41 hours. The initial current was 4.1 amperes and the initial current density was 0.128 amperes per square inch of anode area. At the conclusion of electrodialysis, the current had dropped to 1 ampere and the concentration of the sodium hydroxide solution had increased to 8.37 percent NaOH and its volume had increased about 10 volume percent. The 426 grams of silica hydrogel that were recovered from the anodes had a total volatiles content of 62.44 percent, a $Na_2O$ content (dry basis) of 0.013 percent, a $SO_4^=$ content (dry basis) of 0.013 percent, and a pH of 3.13. The properties of the xerogel products are shown in Table III.

TABLE III

| Regular Density (Dried) | |
|---|---|
| TV % 1750° F. | 5.32 |
| $Na_2O$ % (dry basis) | 0.025 |
| $SO_4^=$ % (dry basis) | 0.035 |
| Total nitrogen % (dry basis) | 0.020 |
| pH | 4.16 |
| Surface area ($m^2/g$) | 798.0 |
| Pore volume (ml/g) | 0.45 |
| Average pore diameter (Å) | 22.0 |
| Intermediate Density (Washed and Dried) | |
| TV % | 2.20 |
| $Na_2O$ % (dry basis) | 0.006 |
| $SO_4^=$ (dry basis) | 0.060 |
| Total nitrogen % (dry basis) | 0.061 |
| pH | 6.12 |
| Surface area ($m^2/g$) | 295.0 |
| Pore volume (ml/g) | 1.11 |
| Average pore diameter (Å) | 150.0 |

The pore distribution of the intermediate density xerogel is shown in Table IV.

TABLE IV

| Pore diameter (Å) | Cumulative Pore Volume (cc/g) | Cumulative Percent of Pore Volume |
|---|---|---|
| 600 | | |
| 580 | | |
| 560 | | |
| 540 | | |
| 520 | | |
| 500 | | |
| 480 | | |
| 460 | | |
| 440 | .0009 | .09 |
| 420 | .0009 | .09 |
| 400 | .0012 | .11 |
| 380 | .0012 | .11 |
| 360 | .0013 | .12 |
| 340 | .0019 | .18 |
| 320 | .0025 | .23 |
| 300 | .0025 | .23 |
| 280 | .0025 | .23 |
| 260 | .0028 | .26 |
| 240 | .0038 | .35 |
| 220 | .0059 | .54 |
| 200 | .0074 | .69 |
| 180 | .0099 | .92 |
| 160 | .0136 | 1.27 |
| 150 | .0263 | 2.44 |
| 140 | .0533 | 4.95 |
| 130 | .0988 | 9.17 |
| 120 | .2287 | 21.23 |
| 110 | .3977 | 36.91 |
| 100 | .7102 | 65.93 |
| 90 | .9320 | 86.51 |
| 80 | 1.0438 | 96.89 |
| 70 | 1.0773 | 100.00 |

This xerogel had 99.18 percent of its pore volume provided by pores having pore diameters of from 70 to 170 angstroms.

EXAMPLE 3

Silica hydrogel and regular density and intermediate density silica xerogels were prepared in accordance with the procedure of Example 1 except that the sodium nitrate concentration was 0.047 normal (4 grams per liter), the length of the run was 27.0 hours and the initial current density was 0.128 amperes per square inch of anode area. The properties of the 522.0 grams of recovered hydrogel and xerogel products are shown in Table V.

TABLE V

| | |
|---|---|
| Hydrogel | |
| TV | 63.03 |
| Na$_2$O % (dry basis) | 0.030 |
| SO$_4$= % (dry basis) | 0.005 |
| Regular Density (dried) | |
| TV | 5.74 |
| Na$_2$O % (dry basis) | 0.098 |
| SO$_4$= % (dry basis) | 0.014 |
| Total nitrogen % (dry basis) | 0.018 |
| pH | 4.56 |
| Surface area (m$^2$/g) | 790.0 |
| Pore volume (ml/g) | 0.41 |
| Average pore diameter (Å) | 20.0 |
| Intermediate Density (Washed and Dried) | |
| TV | 2.57 |
| Na$_2$O % (dry basis) | 0.015 |
| SO$_4$= % (dry basis) | 0.005 |
| Total nitrogen % (dry basis) | 0.035 |
| pH | 6.23 |
| Surface area (m$^2$/g) | 290.0 |
| Pore volume (ml/g) | 1.02 |
| Average pore diameter (Å) | 140.0 |

The recovery of the same or larger quantity of hydrogel in a 27 hour run as in the 47.5 and 41 hour runs of Examples 1 and 2 showed that the increase of the salt concentration of from 0.024 normal (2 grams per liter) to 0.047 normal (4 grams per liter) increased the current by increasing the anolyte conductivity. However, more current was necessary to produce a pound of silica, as the amount of sodium in the solution was also increased.

Constant current runs at sodium nitrate concentrations of from 0.059 to 0.176 normal (5–15 grams per liter) indicated that increasing salt concentration decreases voltage at constant current and soda content of the product, while it also lowers the total volatiles content of the hydrogel.

EXAMPLE 4

This example illustrates the preparation of a high surface area, highly adsorbent regular density silica xerogel in a 5.5 hour run in accordance with the procedure of Example 1 using a silica concentration of 20 percent, sodium sulfate in a concentration of 0.211 normal (15 grams per liter), a constant current of 5 amperes and a constant current density of 0.156 amperes per square inch of anode area. The anolyte temperature during the run was 33° to 42° C. The hydrogel recovered from the anodes was continuously washed for ten hours with a pH 3 aqueous sulfuric acid solution at 22° C. The washed hydrogel was dried for 16 hours at 200° C. in a forced draft oven. The properties of the hydrogel and the xerogel products are shown in Table VI.

TABLE VI

| | |
|---|---|
| Hydrogel | |
| TV % | 45.73 |
| Na$_2$O % (dry basis) | 0.12 |
| Regular Density (Washed and Dried) | |
| TV % | 6.14 |
| Na$_2$O % | 0.009 |
| SO$_4$= % (dry basis) | 0.056 |
| pH | 4.55 |
| Surface area (m$^2$/g) | 831.0 |
| Pore volume (ml/g) | 0.45 |
| Average pore diameter (Å) | 21.0 |
| Water Adsorption | |

| Relative Humidity (%) | Milliliters of Water Adsorbed Per 100 Grams of Gel |
|---|---|
| 10 | 14.66 |
| 20 | 23.63 |
| 40 | 30.44 |
| 60 | 34.78 |
| 80 | 35.80 |

The higher salt concentration, silica concentration, anolyte temperatures and the acid wash resulted in a regular density xerogel having high water adsorption at low relative humidities.

EXAMPLE 5

This example illustrates the preparation of a regular density desiccant xerogel in accordance with the procedure of Example 1 conducted at a constant current of 10 amperes. The other conditions of the run and the properties of the hydrogel and xerogel are shown in Table VII.

TABLE VII

| | |
|---|---|
| Hydrogel | |
| TV % | 47.40 |
| Na$_2$O (dry basis) | 0.25 |
| Regular Density (Dried) | |
| TV % | 6.40 |
| Na$_2$O % (dry basis) | 0.02 |
| SO$_4$ % (dry basis) | 0.074 |
| pH | 5.32 |
| Surface area (m$^2$/g) | 792.0 |
| Pore volume (ml/g) | 0.40 |
| Average pore diameter (Å) | 20.0 |
| Water Adsorption | |

| Relative humidity (%) | Milliliters of Water Adsorbed Per 100 Grams of Gel |
|---|---|
| 10 | 13.61 |
| 20 | 23.89 |
| 40 | 30.83 |
| 60 | 35.46 |
| 80 | 37.93 |

| Conditions | |
|---|---|
| Sodium nitrate concentration | 0.118N (10 g/l) |
| SiO$_2$ concentration (%) | 20.0 |
| Anolyte temperature (°C.) | 40 (approximately) |
| Current density (amps/sq. inch of anode area) | 0.3 |
| Length of run (hours) | 8.0 |

The surface area, pore volume, and water adsorption of the xerogel are substantially equivalent to those of the xerogel of Example 4 prepared with sodium sulfate in a lower concentration. The RD xerogels of Examples 4 and 5 had adsorption capacities of at least about 12 percent at 10 percent relative humidity, at least about 20 percent at 20 percent relative humidity, at least about 28 percent at 40 percent relative humidity, at least about 30 percent at 60 percent relative humidity, and at least about 35 percent at 80 percent relative humidity.

EXAMPLE 6

Three regular density silica xerogels were prepared in accordance with the procedure of Example 1 using electrolysis with an aqueous nitric acid anolyte to purify the hydrogel. The silica concentration was 25 percent and the sodium nitrate concentration was 0.176 normal (15 g/l). The other run conditions and pore distributions of the products are shown in Table VIII. The pore distribution of a conventional regular density silica xerogel is also shown in the table for purposes of comparison.

its pore volume in pores less than 30 angstroms in diameter and 46.01 percent in pores less than 20 angstroms.

EXAMPLE 7

A run was conducted for 108 hours in the cell of Example 1 with an aqueous sodium hydroxide catholyte on an 11 hours on and 1 hour off basis so that the cell operated 99 hours. The anode compartment was filled with an anolyte solution of sodium silicate and sodium nitrate having a silica content of 20 percent, a $SiO_2$ to $Na_2O$ ratio of 3.25, a pH of 11.5, and a sodium nitrate concentration of 0.118 normal (10 grams per liter). A

TABLE VIII

| Conventional RD Silica Xerogel | | | Run 1 | | | Run 2 | | | Run 3 | | |
|---|---|---|---|---|---|---|---|---|---|---|---|
| Pore diam. (Å) | Cum. pore vol. (cc/g) | Cum. percent of pore vol. | Pore diam. (A.) | Cum. pore vol. (cc/g) | Cum. percent of pore vol. | Pore diam. (A.) | Cum. pore vol. (cc/g) | Cum. percent of pore vol. | Pore diam. (A.) | Cum. pore vol. (cc/g) | Cum. percent of pore vol. |
| 600 | 0.0 | 0.0 | 600 | | | 600 | | .01 | 600 | 0.0 | 0.0 |
| 580 | 0.0005 | 0.13 | 580 | | | 580 | | .01 | 580 | 0.0001 | 0.02 |
| 560 | 0.0011 | 0.26 | 560 | | | 560 | | .01 | 560 | 0.0002 | 0.05 |
| 540 | 0.0016 | 0.38 | 540 | | | 540 | | .01 | 540 | 0.0003 | 0.07 |
| 520 | 0.0021 | 0.51 | 520 | | | 520 | | .01 | 520 | 0.0005 | 0.10 |
| 500 | 0.0026 | 0.67 | 500 | | | 500 | | .01 | 500 | 0.0007 | 0.15 |
| 480 | 0.0029 | 0.69 | 480 | .0004 | .10 | 480 | | .01 | 480 | 0.0009 | 0.20 |
| 460 | 0.0030 | 0.72 | 460 | .0004 | .10 | 460 | | .01 | 460 | 0.0012 | 0.25 |
| 440 | 0.0031 | 0.75 | 440 | .0004 | .10 | 440 | | .01 | 440 | 0.0013 | 0.28 |
| 420 | 0.0033 | 0.78 | 420 | .0004 | .10 | 420 | | .01 | 420 | 0.0013 | 0.28 |
| 400 | 0.0035 | 0.83 | 400 | .0004 | .10 | 400 | | .01 | 400 | 0.0013 | 0.29 |
| 380 | 0.0037 | 0.89 | 380 | .0004 | .10 | 380 | | .01 | 380 | 0.0014 | 0.30 |
| 360 | 0.0039 | 0.94 | 360 | .0004 | .10 | 360 | | .01 | 360 | 0.0014 | 0.31 |
| 340 | 0.0041 | 0.99 | 340 | .0004 | .10 | 340 | | .01 | 340 | 0.0014 | 0.31 |
| 320 | 0.0045 | 1.07 | 320 | .0004 | .10 | 320 | | .01 | 320 | 0.0015 | 0.32 |
| 300 | 0.0049 | 1.17 | 300 | .0004 | .10 | 300 | | .01 | 300 | 0.0016 | 0.34 |
| 280 | 0.0053 | 1.28 | 280 | .0004 | .10 | 280 | | .01 | 280 | 0.0016 | 0.35 |
| 260 | 0.0059 | 1.41 | 260 | .0004 | .10 | 260 | | .01 | 260 | 0.0017 | 0.37 |
| 240 | 0.0064 | 1.53 | 240 | .0004 | .10 | 240 | | .01 | 240 | 0.0018 | 0.39 |
| 220 | 0.0073 | 1.74 | 220 | .0004 | .10 | 220 | | .01 | 220 | 0.0019 | 0.41 |
| 200 | 0.0079 | 1.88 | 200 | .0004 | .10 | 200 | | .01 | 200 | 0.0020 | 0.44 |
| 180 | 0.0081 | 1.92 | 180 | .0004 | .10 | 180 | | .01 | 180 | 0.0022 | 0.47 |
| 160 | 0.0085 | 2.02 | 160 | .0004 | .10 | 160 | | .01 | 160 | 0.0025 | 0.55 |
| 150 | 0.0087 | 2.08 | 150 | .0004 | .10 | 150 | | .01 | 150 | 0.0029 | 0.62 |
| 140 | 0.0090 | 2.15 | 140 | .0004 | .10 | 140 | | .01 | 140 | 0.0032 | 0.68 |
| 130 | 0.0093 | 2.21 | 130 | .0004 | .10 | 130 | | .01 | 130 | 0.0035 | 0.75 |
| 120 | 0.0098 | 2.35 | 120 | .0004 | .10 | 120 | | .01 | 120 | 0.0040 | 0.87 |
| 110 | 0.0103 | 2.45 | 110 | .0004 | .10 | 110 | | .01 | 110 | 0.0045 | 0.98 |
| 100 | 0.0110 | 2.62 | 100 | .0004 | .10 | 100 | | .01 | 100 | 0.0050 | 1.08 |
| 90 | 0.0119 | 2.85 | 90 | .0004 | .10 | 90 | .0018 | .46 | 90 | 0.0055 | 1.20 |
| 80 | 0.0132 | 3.14 | 80 | .0004 | .10 | 80 | .0033 | .84 | 80 | 0.0062 | 1.34 |
| 70 | 0.0150 | 3.57 | 70 | .0004 | .10 | 70 | .0069 | 1.74 | 70 | 0.0075 | 1.62 |
| 60 | 0.0172 | 4.09 | 60 | .0004 | .10 | 60 | .0100 | 2.53 | 60 | 0.0093 | 2.01 |
| 50 | 0.0203 | 4.85 | 50 | .0004 | .10 | 50 | .0145 | 3.66 | 50 | 0.0125 | 2.70 |
| 40 | 0.0276 | 6.59 | 40 | .0004 | .10 | 40 | .0230 | 5.81 | 40 | 0.0178 | 3.85 |
| 30 | 0.0941 | 22.45 | 30 | .0099 | 2.31 | 30 | .0462 | 11.66 | 30 | 0.0386 | 8.34 |
| 20 | 0.2264 | 53.99 | 20 | .1173 | 27.26 | 20 | .1519 | 38.36 | 20 | 0.1638 | 35.42 |
| 18 | 0.2652 | 63.25 | 18 | .1701 | 39.52 | 18 | .2003 | 50.61 | 18 | 0.2156 | 46.62 |
| 16 | 0.3059 | 72.97 | 16 | .2264 | 52.60 | 16 | .2531 | 63.95 | 16 | 0.2787 | 60.26 |
| 14 | 0.3801 | 90.66 | 14 | .3189 | 74.09 | 14 | .3357 | 84.80 | 14 | 0.3740 | 80.88 |
| Conditions | | | | | | | | | | | |
| Voltage (volts) | | | | 6 | | | 6 | | | 8 | |
| Current density (amps/sq. inch of anode area) | | | | 0.019–0.106 | | | 0.019–0.100 | | | 0.038–0.234 | |
| Anolyte temperature (°C.) | | | | 28 | | | 28 | | | 35 | |
| Length of run (hours) | | | | 21 | | | 23 | | | 24 | |
| Acid electrolysis | | | | | | | | | | | |
| Nitric acid pH | | | | 1.59 | | | 1.59 | | | 1.65 | |
| Time (hours) | | | | 3 | | | 1 | | | 2 | |

Each of the novel regular density silica xerogels had at least 85 percent of their pore volume in pores less than 30 angstroms in diameter, at least 60 percent in pores less than 20 angstroms in diameter, at least 50 percent in pores less than 18 angstroms in diameter, and at least 35 percent in pores less than 16 angstroms in diameter. The conventional xerogel had 77.5 percent of constant voltage of 12 volts was applied to the cell and the initial current density was 0.20 amperes per square inch of anode area. A sodium silicate solution containing 25.7 percent $SiO_2$ and 10 grams per liter of sodium nitrate was added to the anode compartment as necessary to maintain volume. The anolyte temperature was approximately 45° C.

Hydrogel was removed nine times, washed, and analyzed. Half the hydrogel samples were washed with a pH 3 aqueous nitric acid solution at 22° C. and half at 60° C. The hydrogels were dried in a forced draft oven at 200° C. for 16 hours. The properties of the nine samples of hydrogel and of the regular density xerogel products are given in Table IX.

duce an intermediate density xerogel at the same 10 percent silica and 0.024 normal (2 grams per liter) sodium nitrate concentration.

EXAMPLE 9

This example illustrates the effect of varying the anolyte temperature on the procedure of Example 1 and

TABLE IX

| SAMPLE | A | B | C | D | E | F | G | H | J | AVERAGE |
|---|---|---|---|---|---|---|---|---|---|---|
| Hydrogel | | | | | | | | | | |
| TV % | 41.9 | 40.7 | 46.5 | 39.9 | — | 41.0 | 39.7 | 37.6 | 37.9 | 40.6 |
| $Na_2O$ % (dry basis) | 0.19 | 0.22 | 0.16 | 0.30 | — | 0.34 | 0.60 | 0.45 | 0.68 | 0.37 |
| Regular Density (Washed and Dried) | | | | | | | | | | |
| Wash Temperature (°C.) | 22 | 60 | 22 | 60 | 22 | 60 | 22 | 60 | 22 | |
| TV % | 5.99 | 7.05 | 6.24 | 6.49 | 5.81 | 6.33 | 5.86 | 5.63 | 5.81 | 6.13 |
| $Na_2O$ % (dry basis) | 0.0044 | 0.013 | 0.022 | 0.0045 | 0.0064 | 0.002 | 0.052 | 0.004 | 0.0064 | 0.012 |
| $SO_4^=$ % (dry basis) | 0.067 | 0.070 | 0.042 | 0.13 | 0.083 | 0.073 | 0.046 | 0.48 | 0.083 | 0.12 |
| pH | 4.72 | 4.72 | 5.04 | 5.38 | 5.53 | 5.42 | 5.50 | 5.40 | 5.53 | 5.25 |
| Surface area ($m^2/g$) | 850 | 878 | 847 | 860 | 860 | 832 | 796 | 799 | 860 | 842 |
| Pore volume (ml/g) | 0.44 | 0.47 | 0.45 | 0.44 | 0.43 | 0.38 | 0.38 | 0.38 | 0.40 | 0.42 |
| Average pore diameter (Å) | 20 | 21 | 21 | 20 | 20 | 18 | 19 | 20 | 20 | 20 |
| Water Adsorption | | | | | | | | | | |
| Relative Humidity (%) | | | | | Milliliters of Water Adsorbed Per 100 Grams of Gel | | | | | |
| 10 | 12.78 | 7.09 | 12.76 | 12.64 | 13.52 | 13.49 | 12.09 | 12.96 | 13.52 | 12.32 |
| 20 | 22.80 | 22.27 | 23.06 | 22.05 | 23.19 | 23.62 | 21.50 | 21.80 | 23.19 | 22.61 |
| 40 | 27.17 | 32.96 | 33.10 | 32.67 | 32.81 | 31.62 | 29.74 | 31.04 | 32.81 | 31.55 |
| 60 | 41.50 | 41.26 | 41.57 | 40.40 | 41.19 | 37.49 | 36.09 | 37.76 | 41.19 | 39.83 |
| 80 | 44.47 | 43.73 | 44.58 | 45.35 | 42.01 | 40.40 | 37.62 | 39.94 | 42.01 | 42.27 |

The silica concentration in the sodium silicate solution increased during cell operation from 20% to 25% $SiO_2$ and consequently the total volatiles content decreased from 42% to 38%. A material balance around the electrolytic cell for the week's operation showed about a third of the material leaving the cell was by evaporation. This evaporation loss explains the increase in the silica concentration of the silicate solution.

All the samples had high purity and surface area. The small average pore diameters ranging from 18 to 21 angstroms provided excellent water adsorption, especially at lower relative humidities.

EXAMPLE 8

To illustrate the effect of current density on pore volume, Example 1 which was run for 47.5 hours at an initial current density of 0.156 amperes per square inch of anode area and initial current of 5 amperes was repeated but for 23 hours at an initial current of 18 amperes and initial current density of 0.56 amperes per square inch of anode area. The anolyte temperature in this example was 80° C. in contrast to 25°–35° C. in Example 1. The properties of the hydrogel and xerogel products of this example and of Example I are shown in Table X.

TABLE X

| Process Conditions | Example 7 | Example 1 |
|---|---|---|
| Hydrogel | | |
| TV % | 48.0 | 61.9 |
| Xerogel (Dried) | | |
| TV % | 2.42 | 2.26 |
| $Na_2O$ % (dry basis) | 0.019 | 0.006 |
| $SO_4^=$ % (dry basis) | 0.007 | 0.012 |
| Total nitrogen % (dry basis) | 0.017 | 0.020 |
| pH | 5.89 | 6.00 |
| Surface area ($m^2/g$) | 223.0 | 275.0 |
| Pore volume (ml/g) | 0.84 | 1.10 |
| Average pore diameter (Å) | 151.0 | 159.0 |

The pore volume results show that low current density and low anolyte temperature were required to produce an intermediate density xerogel at the same 10 percent silica and 0.024 normal (2 grams per liter) sodium nitrate concentration.

the product quality. Experiments were conducted using a constant voltage of 8 volts and a sodium silicate solution having a silica concentration of 10% and a sodium nitrate concentration of 0.024 normal (2 g/l). The hydrogels were dried in a forced draft oven at 200° C. for 16 hours. The results shown in Table XI demonstrate that production rates were considerably higher at higher anolyte temperatures but the soda and sulfate contents increased above 70° C. The total volatiles content of the hydrogel and thus the maximum obtainable pore volume of the dried gel when removed from the electrolytic cell was strongly affected by temperature. For example, the T.V. is 46% at 90° C. and 62% at 30°–35° C.

TABLE XI

| Anolyte Temperature Effects | | | | | |
|---|---|---|---|---|---|
| Approximate Anolyte Temperature (°C.) | 90 | 70 | 50 | 30–35 | 25 |
| *Current (amperes) | 13.3 | 11.0 | 8.0 | 6.1** | 5.8 |
| *Current density (amps/sq. inch of anode area) | 0.42 | 0.34 | 0.25 | 0.19 | 0.18 |
| Length of run (hours) | 6.8 | 13.5 | — | 6 | 24 |
| Hydrogel | | | | | |
| Quantity recovered from anodes (g/hr) | 17.6 | 12.2 | — | 19.2 | 14.9 |
| TV % | 46.02 | 48.03 | 54.44 | 61.65 | 62.6 |
| $Na_2O$ % (dry basis) | 0.12 | 0.18 | 0.049 | 0.024 | 0.094 |
| $SO_4^=$ % (dry basis) | 0.067 | 0.006 | 0.022 | 0.055 | 0.051 |
| pH | 2.32 | 2.61 | 2.64 | 2.68 | 2.33 |
| Regular Density (Dried) | | | | | |
| TV % | 8.02 | 5.87 | 6.22 | 5.11 | 5.54 |
| $Na_2O$ % (dry basis) | 0.17 | 0.21 | 0.20 | 0.044 | 0.074 |
| $SO_4^=$ % (dry basis) | 0.13 | 0.053 | 0.061 | 0.032 | 0.035 |
| Total nitrogen % (Dry basis) | 0.013 | 0.040 | 0.016 | 0.014 | 0.017 |
| pH | 4.14 | 3.92 | 3.88 | 3.95 | 4.12 |
| Surface area ($m^2/g$) | 530 | 688 | 778 | 760 | 653 |
| Pore volume (ml/g) | 0.55 | 0.61 | 0.46 | 0.46 | 0.36 |
| Average pore diameter (Å) | 41 | 35 | 24 | 24 | 21 |
| Water Adsorption | | | | | |

Milliliters of Water Adsorbed

TABLE XI-continued
Anolyte Temperature Effects

| Relative humidity (%) | Per 100 Grams of Gel | | | | |
|---|---|---|---|---|---|
| 10 | 4.27 | 7.10 | — | 7.30 | 8.36 |
| 20 | 6.71 | 9.71 | — | 11.20 | 13.53 |
| 40 | 12.61 | 17.19 | — | 28.72 | 27.51 |
| 60 | 22.37 | 36.08 | — | 33.13 | 35.30 |
| 80 | 31.90 | 40.76 | — | 41.56 | 37.97 |

*Since the experiments were run at constant voltage, the current and current density are the values at the start of the run.
**estimated

EXAMPLE 10

This example illustrates the effect of substantial agitation of the anolyte solution in the procedure of Example 1 using sodium sulfate as the salt. Nine runs were conducted in which the anolyte solution was re-circulated between the anode compartment and a storage container so that the entire anolyte solution in the anode compartment was replaced every two minutes. In each run, a tight, thin film of silica plated out on the anode and electrical resistance increased rapidly. Thus, only thin coats could be prepared as the electrical resistance became too high for a thick coat. The silica that was recovered had a high $Na_2O$ content. A typical run is shown in Table XII.

TABLE XII

| | |
|---|---|
| TV % | 50.75 |
| Dried silica | |
| TV % | 3.99 |
| $Na_2O$ % (dry basis) | 3.75 |
| $SO_4^=$ % (dry basis) | 1.49 |
| Surface area ($m^2/g$) | 253.0 |
| Pore volume (ml/g) | 0.31 |
| Average pore diameter (Å) | 49.0 |
| Conditions | |
| Sodium sulfate concentration | 0.141N (10 g/l) |
| $SiO_2$ concentration % | 15 |
| Length of run (hours) | 0.5 |
| Voltage (volts) | 15 |
| Current density (amps/sq. inch of anode area) | 0.156 |

EXAMPLE 11

This example illustrates the effect of the silica concentration in the anolyte solution using sodium sulfate in a concentration of 0.141 normal (10 grams per liter). Four runs were made in accordance with the procedure of Example 1 with all variables held constant except silica concentration and length of the run. Current and current density were held at 5 amperes and 0.156 amperes per square inch of the anode respectively. The hydrogel samples were rinsed with deionized water as each was removed from the cell but were not washed. The silica concentrations and the properties of the hydrogel and dried xerogel are shown in Table XIII.

TABLE XIII
EFFECTS OF SILICA CONCENTRATION IN ANOLYTE

| Silica concentration (%) | 10 | 15 | 20 | 25 |
|---|---|---|---|---|
| Hydrogel TV | | | | |
| TV % | 59.25 | 51.37 | 48.77 | 42.94 |
| Voltage* (volts) | 9.0 | 12.6 | 13.0 | 15.3 |
| Length of run (hours) | 3.4 | 5.5 | 5.0 | 4.0 |
| Xerogel (dried) | | | | |
| $Na_2O$ % (dry basis) | 3.22 | 0.21 | 0.40 | 0.74 |
| $SO_4^=$ % (dry basis) | — | 3.16 | 2.15 | 0.93 |

TABLE XIII-continued
EFFECTS OF SILICA CONCENTRATION IN ANOLYTE

| Silica concentration (%) | 10 | 15 | 20 | 25 |
|---|---|---|---|---|
| pH | 1.76 | 1.95 | 2.30 | 3.15 |

*Since the runs were conducted at constant current, the voltage given is the minimum initial voltage.

The silica concentration affected two properties of the hydrogel. At lower silica concentrations, the voltage to obtain a five ampere current was lower than at higher concentrations, since the electrical resistance of the solution was reduced. Lower silica concentrations also increased the water content of the hydrogel recovered from the anode and thus the pore volume of the xerogel.

EXAMPLE 12

This example illustrates the use of ammonium sulfate as the salt in the anolyte solution in the procedure of Example 1. The properties of the regular density xerogel product after drying without washing and the run conditions are shown in Table XIV.

TABLE XIV

| | |
|---|---|
| Xerogel (Dried) | |
| TV % | 7.28 |
| $Na_2O$ % (dry basis) | 0.27 |
| $SO_4^=$ % (dry basis) | 3.81 |
| pH | 1.95 |
| Surface area ($m^2/g$) | 735 |
| Pore volume (ml/g) | 0.39 |
| Average pore diameter (Å) | 21 |
| Conditions | |
| Ammonium sulfate concentration | 0.150N (8 g/l) |
| $SiO_2$ concentration (%) | 20 |
| Current density (amps/sq. inch of anode area) | 0.156 |
| Length of run (hours) | 6.0 |

Similar runs were conducted using anolyte solutions containing sodium nitrite, sodium carbonate, sodium citrate, sodium silicofluoride, ammonium oxalate, sodium fluoride, sodium chromate, and mixtures of sodium nitrate and ammonium silicofluoride and of sodium nitrate and sodium fluoride.

It was found that the use of sodium sulfate, sodium nitrate, sodium nitrite, and ammonium sulfate produced regular density of intermediate density silica gels depending on the other process variables. The use of the other salts produced intermediate density gels.

What is claimed is:

1. A method of preparing silica gel which comprises electrolyzing an aqueous anolyte solution of an alkali metal silicate and a salt of a non-siliceous anion in a concentration of at least about 0.01 normal in a cell having a cation permselective membrane separating the anolyte and an aqueous catholyte solution to deposit silica hydrogel on an anode of the cell and recovering the silica hydrogel from the anode.

2. The method of claim 1 in which the silica concentration of the anolyte solution is from about 5 to about 30 weight percent.

3. The method of claim 1 in which the silica concentration of the anolyte solution is from about 8 to about 28 weight percent.

4. The method of claim 1 in which the pH of the anolyte solution is at least about 10.

5. The method of claim 1 in which the pH of the anolyte solution is at least about 12.

6. The method of claim 1 in which the anolyte solution has a silica to alkali metal oxide weight ratio of from about 1:1 to about 4:1.

7. The method of claim 1 in which the anolyte solution has a silica to alkali metal oxide weight ratio of about 3.25:1.

8. The method of claim 1 in which the salt is a neutral salt of a strong acid, a basic salt of a weak acid, or an acidic salt of a weak base.

9. The method of claim 8 in which the salt is a salt of the same alkali metal as is present in the alkali metal silicate.

10. The method of claim 1 in which the anion is nitrate, nitrite, carbonate, bicarbonate, sulfate, sulfamate, borate, acetate, citrate, oxalate, silicofluoride, sulfosalicylate, fluoride, phosphate, or mixtures thereof.

11. The method of claim 1 in which the anion is sulfate, nitrate, or carbonate.

12. The method of claim 1 in which the anion is an anion of a strong acid.

13. The method of claim 11 in which the anion is sulfate or nitrate.

14. The method of claim 1 in which the salt is an ammonium salt or alkali metal salt.

15. The method of claim 1 in which the salt is a sodium or potassium salt.

16. The method of claim 1 in which the salt has a concentration of from about 0.01 to about 0.25 normal.

17. The method of claim 1 in which the aqueous catholyte is an aqueous solution of at least one alkali metal hydroxide.

18. The method of claim 1 in which the aqueous catholyte is an aqueous solution of a hydroxide of the same alkali metal as is present in the alkali metal silicate.

19. The method of claim 1 in which the anode comprises a conductive coating of a platinum group metal, metal oxide, or mixture thereof on a metal substrate of titanium, tantalum, zirconium, niobium, hafnium, or mixtures thereof.

20. The method of claim 1 in which the cathode comprises iron, steel, stainless steel, nickel, or a nickel alloy.

21. The method of claim 1 in which the anolyte solution is electrolyzed at a current density of from about 0.1 to about 2 amperes per square inch of anode area.

22. The method of claim 1 in which the temperature of the anolyte solution is from about 10° to about 100° C.

23. The method of claim 1 in which the temperature of the anolyte solution is from about 25° to about 45° C.

24. The method of claim 1 in which the recovered hydrogel is aged at about 32° to about 82° C. for from about 5 to about 48 hours.

25. The method of claim 1 further comprising washing the recovered hydrogel with water, an acidic aqueous medium, or an alkaline aqueous medium.

26. The method of claim 25 in which the hydrogel is washed with an acidic aqueous medium.

27. The method of claim 26 further comprising drying the washed hydrogel.

28. The method of claim 25 in which the hydrogel is washed with an aqueous alkaline medium.

29. The method of claim 28 further comprising drying the washed hydrogel.

30. The method of claim 25 further comprising drying the washed hydrogel.

31. The method of claim 1 further comprising drying the recovered hydrogel.

32. The method of claim 1 in which the silica concentration of the anolyte solution is from about 8 to 15 weight percent, the temperature of the anolyte solution is from about 10° to about 50° C., and the anolyte solution is electrolyzed at a current density of from about 0.1 to about 0.4 amperes per square inch of anode area.

33. The method of claim 1 in which the silica concentration of the anolyte solution is from about 15 to about 28 weight percent, the temperature of the anolyte solution is from about 10° to about 80° C., and the anolyte solution is electrolyzed at a current density of from about 0.1 to about 2 amperes per square inch of the anode area.

34. The method of claim 1 further comprising removing the anolyte solution from the cell and electrolyzing an aqueous acid anolyte solution in the cell for at least about one hour to purify the hydrogel.

35. The method of claim 34 in which the acid anolyte is an aqueous solution of the non-siliceous anion.

36. The method of claim 35 in which the acid anolyte is an aqueous solution of nitric acid or carbonic acid.

37. The method of claim 35 in which the electrolysis is effected for about one to about three hours at a current density of from about 0.01 to about 0.4 amperes per square inch.

38. A method of preparing a silica xerogel which comprises electrolyzing in the substantial absence of agitation an aqueous anolyte solution of sodium silicate and a salt selected from the group consisting of sodium nitrate and sodium sulfate, said solution having a silica concentration of from about 8 to about 28 weight percent, a salt concentration of from about 0.01 to about 0.25 normal, a temperature of from about 25° to about 45° C., and a pH of at least about 12, in a cell having a cation permselective membrane separating the anolyte and an aqueous sodium hydroxide catholyte solution to deposit silica hydrogel on an anode of the cell, recovering the hydrogel from the anode, and drying the hydrogel to provide the silica xerogel.

* * * * *